US006672771B2

(12) United States Patent
Cox et al.

(10) Patent No.: US 6,672,771 B2
(45) Date of Patent: Jan. 6, 2004

(54) DEVICE FOR ALIGNING FIBER OPTIC CONNECTORS

(75) Inventors: Larry R. Cox, Austin, TX (US); William J. Clatanoff, Austin, TX (US); Harry A. Loder, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 81 days.

(21) Appl. No.: 10/100,726

(22) Filed: Mar. 19, 2002

(65) Prior Publication Data

US 2003/0180004 A1 Sep. 25, 2003

(51) Int. Cl.[7] ................................................. G02B 6/36
(52) U.S. Cl. ............................... 385/53; 385/90; 385/92
(58) Field of Search .............................. 385/53, 89, 90, 385/92, 62, 54

(56) References Cited

U.S. PATENT DOCUMENTS

| 5,104,242 A | * | 4/1992 | Ishikawa ..................... 385/53 |
| 5,737,463 A | * | 4/1998 | Weiss et al. .................. 385/59 |
| 6,357,928 B1 | * | 3/2002 | Haley et al. .................. 385/59 |
| 6,419,399 B1 | | 7/2002 | Loder et al. |

* cited by examiner

Primary Examiner—Hae Moon Hyeon
(74) Attorney, Agent, or Firm—Yeo Tong Florczak

(57) ABSTRACT

The present invention pertains to a multi-fiber optic connector system. The system contains a first housing and a second housing. The first housing contains (i) a first portion having at least one first cavity (ii) a second portion having at least one second cavity, a reference surface, and a first groove, and (iii) at least one alignment element disposed on the first groove. When an optical connector is slidably engaged into the first housing, the alignment element, having spring-like properties, contacts the optical connector and forces it against the reference surface.

19 Claims, 3 Drawing Sheets

DEVICE FOR ALIGNING FIBER OPTIC CONNECTORS

TECHNICAL FIELD

The present invention pertains to a device useful in an optical connector containing multi-fiber ferrule containing optic fibers. In particular, the inventive device is an alignment element that fits into a housing such that when a connector is slidably attached to the housing, the alignment element forces the connector against a reference surface thereby ensuring proper alignment of the connectors.

BACKGROUND

The use of optical fibers for high-volume, high-speed communication is well established. As the volume of transmitted information grows, the use of optical fiber cables that have multiple optical fibers and of systems using multiple optical fiber cables has increased.

Fiber optic terminations are evolving from single terminations to mass terminations. Within the past few years, ribbonized multi-fiber cables have been developed. In conjunction with these cable development efforts, multi-fiber mounting ferrules also have been developed.

The design of traditional electronic cabinets is now being altered to accommodate optical and opto-electronic devices. In traditional cabinet designs, the cabinet contains a box having a backplane and plurality of internal slots or racks, generally parallel to each other. Components are mounted on planar substrates, commonly referred to as "circuit boards" or "daughter cards," which are designed to slide into the slots or racks within the cabinet.

An example of a backplane application is the interconnection of telephone switching equipment where the cards, having optical and electronic telecommunication components, typically disposed on daughter cards, are slid into cabinets. As with electrical cables, the need exists to provide for a means to allow the fiber signals to pass through the backplane of the cabinets. Another need is to have a removable fiber termination from the front side and the backside of the backplane. Furthermore, when the cards are inserted and removed from a rack coupled to the backplane, coupling and uncoupling of the optical connections in the card occurs in a blind mating manner causing added alignment challenges.

In order to maintain appropriate transmission of light signals, optical fiber ends are to be carefully aligned along three movement (x, y, and z in Cartesian coordinate system) axes, as well as angularly. As the number of optical fibers to be aligned increases, alignment challenges also increase. Blind mating of a card-mounted component to a backplane connector has been found to create special alignment challenges along the axis of interconnection.

For the purposes of the present description, the axis of interconnection is called the longitudinal or x-axis and is defined by the longitudinal alignment of the optical fibers at the point of connection. Generally, in backplane applications, the longitudinal axis is collinear with the axis of movement of the cards and the axis of connection of the optical fibers in and out of the cabinets. The lateral or y-axis is defined by the perpendicular to the x-axis and the planar surface of the card. Finally, the transverse or z-axis is defined by the orthogonal to the x-axis and the backplane surface. The angular alignment is defined as the angular orientation of the card with respect to the x-axis.

Some skilled in the art have tried to address the ferrule alignment issue. For example, U.S. Pat. No. 5,619,604 (Shiflett et al.) discloses a multi-fiber optical connector using a multi-fiber ferrule such as a mechanical transfer (MT) connector that can be mated with and received by an optical receptacle. Multiple alignment features help align and mate the connector to another multi-fiber object. The connector has a guide prong beneath which is mounted the ferrule. The prong provides a reference surface that functions as a pre-alignment mechanism for the ferrule. The connector also has a U-shaped enclosure containing a spring tab. In use, the reference surface engages the upper surface of the ferrule while the spring tab engages the lower surface of the ferrule and forces it against the reference surface.

The need remains for other connector systems that provide a repeatable and cost effective way to mate ferrules.

SUMMARY

One of the challenges in a mechanical system, such as the present multi-fiber connector system, stems from the fact that most of the components are precision molded and machined. As such, the dimensions of the components consistently need to be as near to the design specification as possible for repeated alignment of the components. Holding the components to precise target dimensions (i.e., dimensions that can deviate from one another only in the 0.001 inch range (0.254 mm)) can be difficult and very expensive for molded and machined parts. Even if the components are consistently held to the target dimensions when fabricated, in use the components may be exposed to environmental conditions that may slightly change their dimensions. Most of the components can be used in applications lasting up to twenty years, further increasing the possibility of dimensional changes. The present invention provides for a cost effective approach to align the components that may have slight dimensional deviations, caused in the manufacturing process, caused by environmental changes, caused by extended use, or caused by a combination of these and other factors.

The present invention relates to an optical fiber interconnect system that provides alignment of the ferrules in the x, y, and z directions by use of a unique alignment element. In some embodiments, the inventive interconnect system provides for interconnecting arrays of optical fiber cables in an individual or in a collective fashion. As used herein, the term "backplane" refers to an interconnection plane where a multiplicity of interconnections may be made, such as with a common bus or other external devices. In very brief summary, the present invention provides for an alignment element exhibiting spring-like behavior where the alignment element provides a deflection force against ferrule housings to align the ferrules residing therein. The inventive connector system comprises (a) a housing comprising at least one passageway, each passageway having a first end, a second end opposite the first end, and a reference surface; (b) at least one first optical connector slidably engaged into the first end of the passageway, each first optical connector comprising a ferrule housing and a first ferrule disposed inside the ferrule housing, the first ferrule having at least one port, the ferrule housing having first surface opposite a second surface; and (c) an alignment element. As the alignment element engages the first surface of the ferrule housing, the alignment element forces the second surface of the ferrule housing against the reference surface.

In one preferred embodiment, the present invention provides for a multi-fiber optic connector system comprising:

(a) a first housing assembly comprising a first portion having at least one first cavity, a second portion having at least one second cavity, each second cavity having a reference surface and a first groove and wherein the first and second portions are aligned such that the first cavity and the second cavity form a passageway, at least one alignment element disposed on the first groove of the second portion; and (b) at least one first optical connector comprising a first ferrule having a plurality of ports, the first ferrule disposed inside a ferrule housing. When the first optical connector is inserted into the first portion and resides in the passageway, the alignment element contacts the first ferrule housing and forces it against the reference surface.

In the present invention, ferrule alignment can be achieved in various ways. For example, the first and second cavities, the ferrule housing, and the protrusions, by virtue of their size and shape, form the coarse alignment. Because, as discussed above, the dimensions of these components can vary, the fine alignment is achieved by use of the alignment element.

Unlike U.S. Pat. No. 5,619,604, the present invention does not use a tab to push the ferrule directly against a reference surface. Instead, the present invention uses a unique alignment element to guide a ferrule housing and/or a protrusion against a reference surface. One of the advantages of the present invention is that, by virtue of the design, the ferrules are protected inside a housing and are allowed to float inside the housing. The term "float" as used in the previous sentence means generally that the ferrules have some freedom of movement in the y and z directions so that as the ferrules are being mated during interconnection or as the ferrules are exposed to various environmental conditions, the probability of having the ferrules mate or stay mated, espectively, is increased.

BRIEF DESCRIPTION OF THE DRAWINGS

The invention will be further described with reference to the drawing wherein.

These figures are idealized, not drawn to scale, and are intended merely to be illustrative and non-limiting.

DETAILED DESCRIPTION

Figure 1:
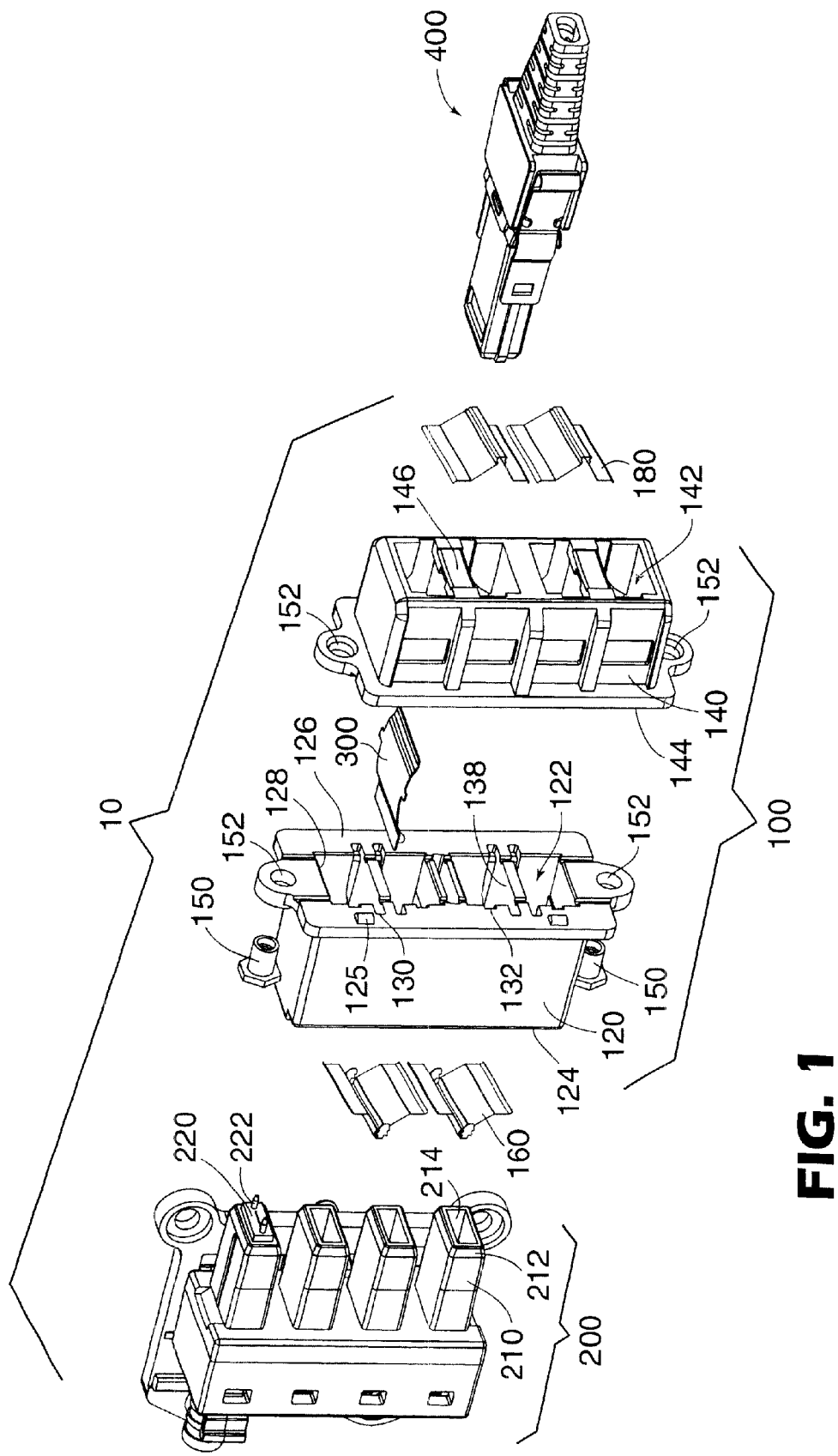
FIG. 1 is an exploded isometric view of one embodiment of a connector system in accordance with the present invention.

FIG. 1 illustrates one embodiment of an optical interconnect system 10 in accordance with the present invention.

The optical interconnect system 10 includes a first housing 100 (also referred to as a "backplane housing"). In use, the backplane housing is mounted on a backplane (not shown). In the present embodiment, backplane housing 100 comprises molded plastic pieces of a dielectric material that have the structural strength and dimensional stability required to maintain control of the optical fiber's position. Such materials include, but are not limited to, thermoplastic injection moldable polymers that are filled or unfilled with reinforcement agents, and transfer moldable polymers such as epoxy. The backplane housing 100 includes a first portion 140, a second portion 120, at least one alignment element 300, and optionally first doors 180 and second doors 160. In a preferred embodiment, the first portion is metallic.

First portion 100 has at least one first cavity 142 for receiving a first optical connector 400, a first surface 146 where first doors 180 can be mounted, and bores 152 as a means for attaching the second portion to the first portion and, if desired, for attaching to a backplane (not shown). In a preferred embodiment, first portion 100 contains an array of four first cavities. In use, as first connector 400 is slidably engaged into first cavity 142, first doors 180 fold down and remain in the folded position. In a preferred embodiment, the doors are hingedly coupled to first surface 146 and close a pair of first cavities.

Second portion 120 has at least one second cavity 122, each cavity having: reference surface 128, first groove 130 for capturing and holding alignment element 300 in place and second groove 132 for polarization of optical connector 400. The second portion also has first surface 126 and second surface 124. As better shown in FIG. 2, groove 130 starts from first surface 126 and extends into the second cavity. In a preferred embodiment, second portion 120 contains an array of four-second cavities. Optionally, the second portion can include male locating features 125 that engage with corresponding female features (not shown) on second surface 144 of first portion 140. The locating features help ensure accurate alignment between the first and second portions during assembly.

It should be understood that, in alternative embodiments, portions 120 and 140 do not need to be separate and could be molded as one piece. Splitting portions 120 and 140, however, may allow for more freedom in mold core design.

In the present embodiment, fasteners 150 secure the backplane housing 100 to a backplane (not shown). Fasteners 150 include threaded metal inserts inserted through matching bores 152 in the first and second portion 140 and 120 of the backplane housing 100. Those skilled in the art will readily appreciate that mounting screws are used in conjunction with fasteners 150 and that a variety of fastening mechanisms, adhesives, interference fitting, and other devices known in the art may be used to align and secure backplane housing 100.

Doors (also referred to as "shutters") 160 and 180 are preferably retractable. The doors in the present embodiment include flat spring metal members hingedly coupled to first surface 146 and second surface 124. As stated above, the doors are designed to fold down when an object, such as, e.g, a connector, is inserted into the cavities. The doors can be made of a conductive metal material, such as tempered stainless steel, beryllium/copper alloys or other materials, and are coupled to provide a grounding electrical path. The doors can serve several functions, such as (1) providing a physical barrier to limit ambient contamination from entering the assembled connector housing, (2) absorbing and route to ground electric magnetic interference that may otherwise leak through the cavities through the backplane; and (3) providing eye safety from emitted light signals from either end of the backplane.

The double door design allows for the sealing of the optical connection without the need to include special gated terminations at each connector. The double door arrangement also allows for at least one door to be closed any time a receiving cavity is not filled by both a rear and a front plug. In embodiments where the user is not concerned with any of the above issues, the use of doors may be optional without effecting the performance and function of the backplane housing.

Figure 2:
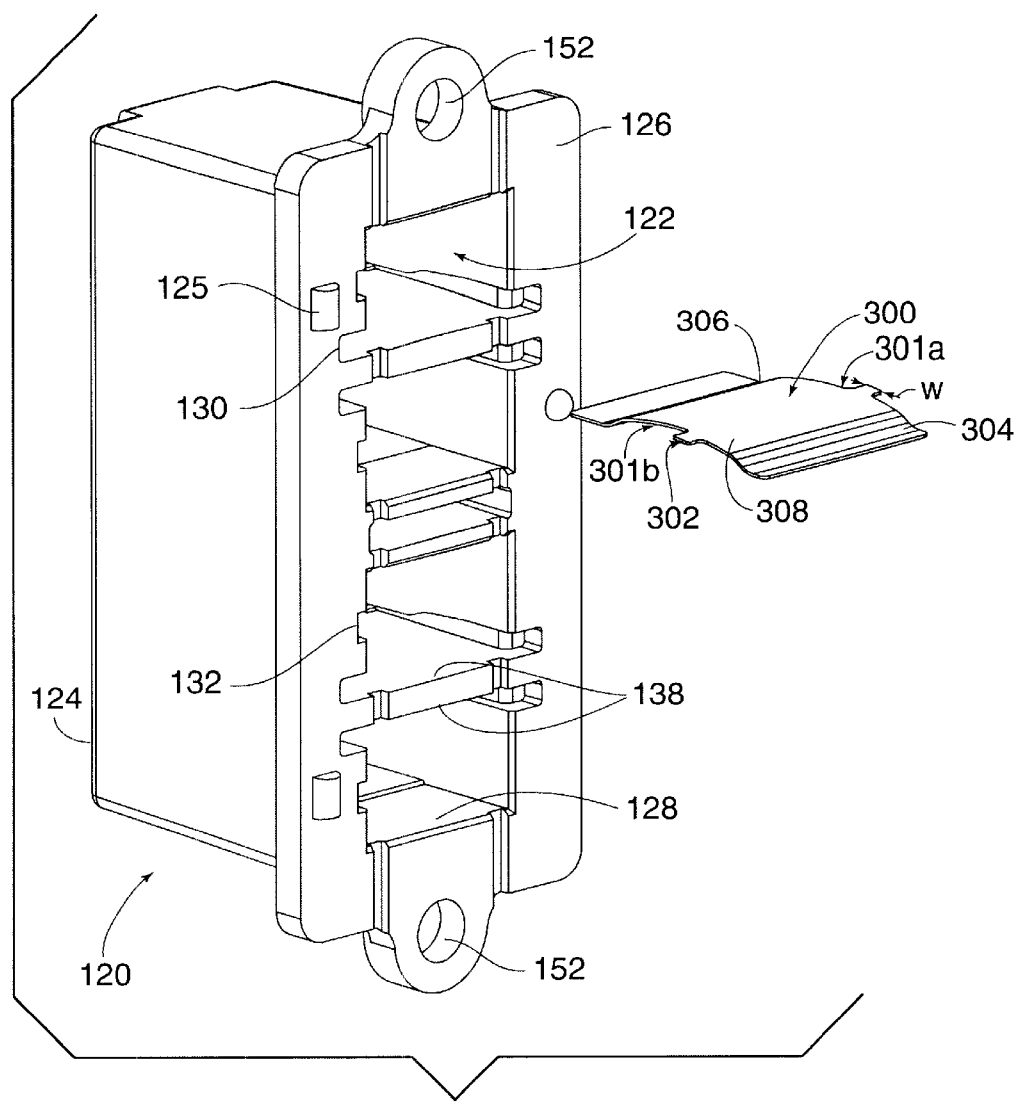
FIG. 2 is an exploded side view of an illustrative alignment element 300 and a second portion 120 of a backplane housing.

As better shown in FIG. 2, alignment element 300 has two major surfaces 301a and 301b that are substantially parallel to one another, at least one tab 302 extending from at least one of the two major surfaces, a curved portion 308, a first foot portion 304, and a second foot portion 306. For ease of understanding, only one alignment element is shown. Each foot portion has a flat surface extending from the foot thereby allowing for movement of each foot when the alignment element is in use. In a preferred embodiment, alignment element 300 fits into first groove 130 such that tab 302 having a width w reside in the groove. Groove 130 is preferably designed so as to incorporate the curved shape of the alignment element. Even though the alignment element of FIG. 2 has curvature, its dimensions, in an unused state can be described as having a length in the range of about 0.5 to 0.75 inches (12.7 to 19.1 mm), a width of in the range of about 0.4 to 0.6 inches (10.2 to 15.2 mm), and a thickness that is dependent on the material selected and the amount of force desired. In a preferred embodiment, the alignment element has a thickness of about 0.003 to 0.015 inch (0.18 to 0.38 mm), more preferably about 0.004 to 0.006 inch (0.10 to 0.15 mm).

The alignment element has spring-like properties and can be made from metals, plastics, and combinations thereof. Preferably, the alignment element is a metal selected from the group consisting of beryllium copper alloy, stainless steel, and phosphor bronze. In use, when an object (such as a connector) is disposed on the alignment element, it deflects from about 0.005 to 0.015 inch (0.13 to 0.38 millimeters) and the two feet 304 and 306 are displaced from their original position. The foot portions provide an advantage in that, because they have a flat portion, the alignment element does not lodge itself into the housing.

Figure 4:
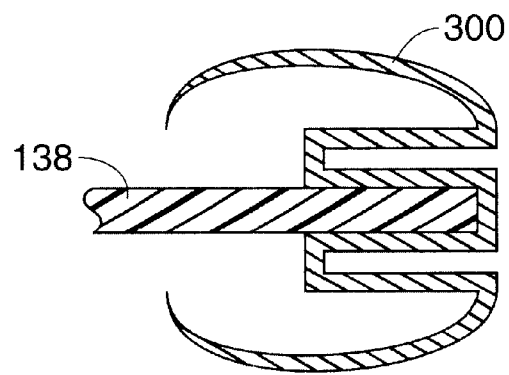
FIG. 4 is an alternative embodiment of an alignment element 300 that can be used accordance with the present invention.

FIG. 4 shows an alternative embodiment of alignment element 300. In this embodiment, the alignment element is self-retaining, e.g., by self-attaching to floor 138 of second portion 120. Also, when the self-attaching alignment element is used, the second portion may need to be modified, e.g, grooves 130 may not be needed.

The alignment elements of FIGS. 2 and 4 can be made by various methods, depending on the materials used. If a metal-based material is used, the alignment element can be fabricated by metal stamping. If a polymer-based material is used, the alignment element can be fabricated by injection molding. One skilled in the art will readily appreciate that a variety of fabrication methods can be used to fabricate the alignment element.

As shown in FIG. 1, a second housing 200 (also referred to as "daughter card housing") includes at least one hollow protrusion 210 shaped in size to correspond and fit into rear cavities 122 of the backplane housing 100. In use, the daughter card housing is mounted on a substantially planar card, such as a circuit card or a daughter card. The card may include optical, optoelectronic, and electronic components. Those skilled in the art will be readily aware of the various methods for attaching the daughter card housing 200 to the card. Alternative embodiments may include attachment means such as mechanical fasteners, spring clips or the like.

The protrusions 210 in the present embodiment are hollow and rectangular shaped and are terminated in a truncated pyramid shaped lead 212. The pyramid shaped lead functions as a pre-alignment and allows for compensation of certain mating misalignments by directing protrusions 210 into second cavities 122 of the backplane housing. Protrusions 210 are shaped to provide alignment with respect to the inside walls of second cavities 122. Protrusions 210 also provide an automatic pressure for opening front doors 160 during mating. The inner walls of protrusion 210 define a stepped cavity 214 that provides guidance to a fiber optic ferrule 220 to be seated inside of the stepped cavity. In the present embodiment, the stepped cavity 214, is shaped to receive an industry standard ferrule, such as the mechanical (MT) style optical ferrules.

Figure 3:
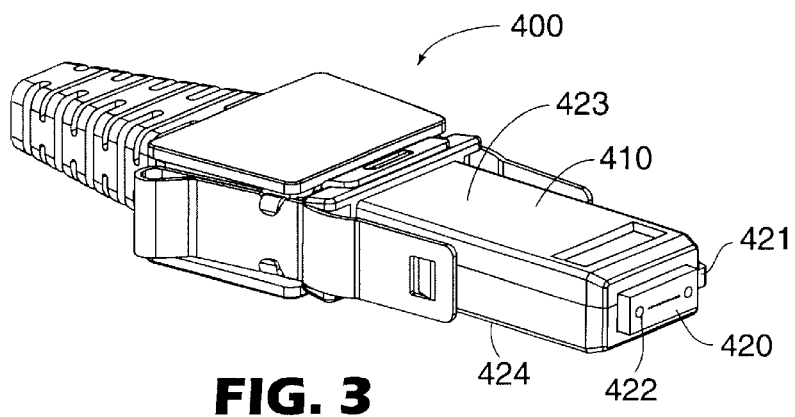
FIG. 3 is an assembled view of an illustrative connector.

FIG. 3 shows an optical connector 400 having a ferrule 420 seated inside a ferrule housing 410, at least one port or hole 422, and a polarization feature 421. Current connector assemblies include forward biased spring mounted ferrules. The bias springs absorb a limited amount of over travel of the ferrules during mating and provide a predetermined spring biasing force thus urging the ferrules intimately together when the ferrules are in their mated position. The ferrule housing has a first surface and a second surface opposite the first surface. In use, when the optical connector is slidably engaged into the passageway of the first housing, the alignment element contacts the housing's first surface and forces the housing's second surface against the reference surface.

Figure 5:
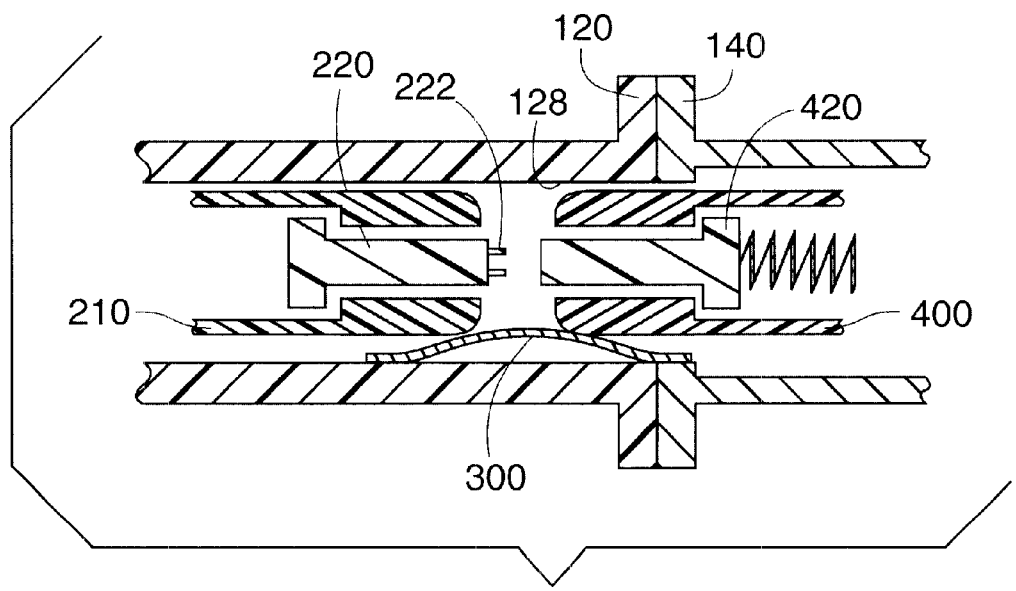
FIG. 5 is a cross-sectional schematic view of one aspect of the invention.

FIG. 5 schematically illustrates a connector system in use and is a simplified version of FIG. 1. Referring to FIGS. 1 and 5, first portion 140 has been mated with second portion 120 to form a passageway. Alignment element 300 is disposed primarily in the second portion 120 but a portion of it resides in first portion 140. First optical connector 400 is slidably engaged into the first cavity and travels into the second cavity whereupon it contacts alignment element 300 at which point the element 300 forces the connector up against reference surface 128. Through openings 124, daughter card housing 200 is then slidably engaged into the second portion 120 of backplane housing 100. During this engagement process, second doors 160 are folded down and the housing 200 stops when second ferrule 220 is mated with first ferrule 420 such that pins 222 reside in ports or holes 422. By the design of protrusion 210 and second cavity 122, the protrusion is forced against the same reference surface 128. By this action, the ferrules 220 and 420 are aligned. In one embodiment, protrusion 210 does not contact the alignment element. In an alternative embodiment, the protrusion 210 does contact the alignment element.

Another fiber optic connector that can be used in the present invention is described in U.S. Pat. No. 6,419,399, commonly owned by the same assignee as the instant application, which disclosure is hereby incorporated by reference in its entirety. FIG. 2 of the above cited application shows a cross section of a backplane with a backplane housing and a daughter card with a daughter card housing. The backplane and daughter card housings of the present invention can be similarly mounted onto the backplane and the daughter card shown in FIG. 2 of the application.

What is claimed is:
1. A multi-fiber optic connector system comprising:
   (a) a first housing comprising
      (i) a first portion having a first surface, a second surface, and at least one first cavity,
      (ii) a second portion having a first surface, a second surface, and at least one second cavity, each second cavity having a reference surface and a first groove, wherein the second surface of the first portion is disposed with the first surface of the second portion and the first and the second portions are aligned such that the first cavity and the second cavity form a passageway,

(iii) at least one alignment element disposed on the first groove of the second cavity; and (b) at least one optical connector comprising a ferrule housing and a first ferrule disposed inside the ferrule housing, the first ferrule having at least one port;

wherein when the optical connector is inserted into the first portion and resides in the passageway, the alignment element contacts the ferrule housing and forces it against the reference surface.

2. The connector system of claim 1 further comprising a second housing comprising at least one protrusion and at least one second ferrule, the second ferrule having at least one pin, wherein when the second housing is slidably engaged into the second cavity of the first housing, the pin of the second ferrule mate with the ports of the first ferrule.

3. The connector system of claim 2 wherein at least one of the first ferrule and second ferrule is spring loaded.

4. The connector system of claim 1 wherein the alignment element exhibits spring-like properties and is a metal selected from the group consisting of beryllium copper alloy, stainless steel, and phosphor bronze.

5. The connector system of claim 1 further comprising at least one retractable door disposed on at least one of the first surface of the first cavity and the second surface of the second cavity.

6. The connector system of claim 1, wherein the alignment element has two major sides substantially parallel to one another, at least one tab protruding from one of the major sides, a curved portion, and at least one foot portion.

7. The connect system of claim 6, wherein the curved portion of the alignment element has a bend radius of about 0.75 inch.

8. The connector system of claim 6, wherein the alignment element is metallic and has a thickness of about 0.003 to 0.015 inches.

9. The connector system of claim 6, wherein the alignment element is deflected from about 0.005 to 0.015 inch from its initial position when the optical connector is engaged in the passageway.

10. The connector system of claim 1, wherein the alignment element has a pair of tabs disposed in the first grooves of the second portion of the first housing.

11. The connector system of claim 1, wherein the optical connector further comprises a polarization feature such that when the optical connector is slidably engaged in the passageway, the polarization feature mates with a second grove in the second cavity of the second portion.

12. The connector system of claim 1, wherein the alignment element is self-retaining and is disposed on the floor of the second portion of the first housing assembly.

13. The connector system of claim 2, wherein the alignment element is disposed under at least one of the optical connector and the protrusion.

14. The connector system of claim 2, wherein the first portion has an array of four first cavities and the second portion has an array of four second cavities.

15. The connector system of claim 1, wherein the first portion and second portion are formed substantially as one unit.

16. A connector system comprising:
(a) a housing comprising at least one passageway, each having a first end, a second end opposite the first end, and a reference surface;
(b) at least one first optical connector slidably engaged into the first end of the passageway, each first optical connector comprising a ferrule housing and a first ferrule disposed inside the ferrule housing, the first ferrule having at least one port, the ferrule housing having first surface opposite a second surface; and
(c) an alignment element;

wherein as the alignment element engages the first surface of the ferrule housing, the alignment element forces the second surface of the ferrule housing against the reference surface.

17. The connector system of claim 16 wherein the alignment element exhibits spring-like properties and is a metal selected from the group consisting of beryllium copper alloy, stainless steel, and phosphor bronze.

18. The connector system of claim 16 further comprising at least one second optical connector comprising a second ferrule housing and a second ferrule disposed inside the ferrule housing, the second ferrule having at least one pin, wherein when the second optical connector is slidably engaged into the second end of the passageway of the housing, the pins on the second ferrule mate with the ports on the first ferrule.

19. The connector system of claim 16 wherein at least one of the first and second ferrule is spring loaded.

* * * * *

UNITED STATES PATENT AND TRADEMARK OFFICE
CERTIFICATE OF CORRECTION

PATENT NO.    : 6,672,771 B2
DATED         : January 6, 2004
INVENTOR(S)   : Cox, Larry R.

It is certified that error appears in the above-identified patent and that said Letters Patent is hereby corrected as shown below:

Title page,
Item [56], References Cited, U.S. PATENT DOCUMENTS,
please add -- 4,281,892     8/1981      Sitabkhan
              5,127,084     6/1992      Takahashi
              5,881,191     3/1999      Liberty --
FOREIGN PATENT DOCUMENTS,
please add -- EP 1 014 126 A2    12/1999  Roth
              EP 1 054 277 A2     5/2000  Shahid
              DE 199 13 449       9/2000  Mohs
              DE 26 11 168        9/1977  Pteiffer
Item [74], *Attorney, Agent, or Firm*,
delete "Yeo" and insert in place thereof -- Yen --

Column 3,
Line 34, delete "espectively" and insert in place thereof -- respectively --
Line 44, delete "and" and insert in place thereof -- and of --

Column 7,
Line 16, delete "claim 2" and insert in place thereof -- claim 2, --
Line 18, delete "claim 1" and insert in place thereof -- claim 1, --
Line 30, delete "connect" and insert in place thereof -- connector --

Column 8,
Line 2, delete "grove" and insert in place thereof -- groove --
Lines 30 and 42, delete "claim 16" and insert thereof -- claim 16, --

Signed and Sealed this

Twenty-ninth Day of June, 2004

JON W. DUDAS
*Acting Director of the United States Patent and Trademark Office*